US010213945B2

(12) United States Patent
Nguyen

(10) Patent No.: US 10,213,945 B2
(45) Date of Patent: Feb. 26, 2019

(54) THREADED MOLD DECOUPLING SYSTEM

(71) Applicant: NYPROMOLD INC., Clinton, MA (US)

(72) Inventor: Tuan H. Nguyen, Clinton, MA (US)

(73) Assignee: NYPROMOLD, INC., Clinton, MA (US)

( * ) Notice: Subject to any disclaimer, the term of this patent is extended or adjusted under 35 U.S.C. 154(b) by 0 days.

(21) Appl. No.: 15/938,913

(22) Filed: Mar. 28, 2018

(65) Prior Publication Data

US 2018/0215087 A1 Aug. 2, 2018

Related U.S. Application Data

(63) Continuation of application No. PCT/US2016/054435, filed on Sep. 29, 2016.

(51) Int. Cl.
*B29C 45/40* (2006.01)
*B29C 45/26* (2006.01)
(Continued)

(52) U.S. Cl.
CPC .......... *B29C 45/262* (2013.01); *B29C 33/446* (2013.01); *B29C 43/50* (2013.01);
(Continued)

(58) Field of Classification Search
CPC .................................................. B29C 45/262
See application file for complete search history.

(56) References Cited

U.S. PATENT DOCUMENTS 5,061,168 A 10/1991 Fox
5,565,223 A * 10/1996 McCready ............ B29C 45/262
249/59
(Continued)

FOREIGN PATENT DOCUMENTS

JP 08258095 A 10/1996
JP 2001121588 A 5/2001
WO 2012104094 A1 8/2012

OTHER PUBLICATIONS

International Search Report dated Dec. 28, 2016 from corresponding International Application No. PCT/US2016/054435.
(Continued)

*Primary Examiner* — Jill L Heitbrink
(74) *Attorney, Agent, or Firm* — DuquetteLawGroup, LLC

(57) ABSTRACT

A threaded mold decoupling system includes at least one unscrewing assembly rotatably coupled to a mounting plate and disposed in proximity to a threaded core of an injection mold, an elevator assembly having a first elevator element rotatably coupled to the mounting plate and a second elevator element connected to a fixed plate, the fixed plate opposing the mounting plate, and a driving assembly disposed in operative communication with the at least one unscrewing assembly and with the first elevator element of the elevator assembly. The driving assembly is configured to actuate the at least one unscrewing assembly to rotate a molded article about a longitudinal axis of the threaded core and actuate the first elevator element relative to the second elevator element to linearly translate the mounting plate relative to the fixed plate and to translate the molded article along the longitudinal axis of the threaded core.

18 Claims, 11 Drawing Sheets

(51) Int. Cl.
*B29C 33/44* (2006.01)
*B29C 43/50* (2006.01)
*B29L 31/56* (2006.01)

(52) U.S. Cl.
CPC ...... *B29C 45/2681* (2013.01); *B29C 45/4005* (2013.01); *B29C 2045/4042* (2013.01); *B29C 2045/4078* (2013.01); *B29L 2031/565* (2013.01)

(56) References Cited

U.S. PATENT DOCUMENTS

| | | | |
|---|---|---|---|
| 6,238,202 B1 | 5/2001 | Joseph | |
| 6,241,931 B1 | 6/2001 | Ciccone et al. | |
| 6,599,115 B2 * | 7/2003 | Chalcraft | B29C 33/446 |
| | | | 264/334 |
| 8,393,888 B2 * | 3/2013 | Halter | B29C 45/1769 |
| | | | 425/556 |
| 2006/0131787 A1 | 6/2006 | Seidelman et al. | |

OTHER PUBLICATIONS

European Search Report dated Oct. 1, 2018 from corresponding European Application EP16852591.3.

\* cited by examiner ial Application No.
THREADED MOLD DECOUPLING SYSTEM

RELATED APPLICATIONS

This patent application is a continuation of International Application No. PCT/US2016/054435 filed on Sep. 29, 2016, entitled "Threaded Mold Decoupling System" which claims the benefit of U.S. Provisional Application No. 62/235,956, filed on Oct. 1, 2015, entitled "Threaded Mold Decoupling System," the contents and teachings of each of which are hereby incorporated by reference in their entirety.

BACKGROUND

Conventional injection molds are utilized to manufacture a variety of molded articles. For example, certain injection molds are used to produce threaded molded articles, such as threaded plastic covers for bottles or other containers. These injection molds utilize threaded cores to form the threads in the molded articles.

At the end of a molding cycle, a variety of mechanisms can be utilized to remove the threaded molded articles from the corresponding threaded cores. The removal mechanism utilized, however, can depend upon the design of the molded articles.

For example, if the plastic material of the threaded molded article is substantially flexible or resilient, the removal mechanism can push the threaded molded article from the threaded core, such as by using a conventional stripper ring. Alternately, if the plastic material is not sufficiently flexible, the removal mechanism can unscrew the threaded molded article from the corresponding threaded core to minimize damage to the threads. For example, the removal mechanism can be configured as a :hydraulically operated rack and stripper plate. Actuation of the hydraulically operated rack can rotate the threaded cores of the injection mold relative to the molded articles in order to decouple the threads of the cores from the corresponding threads of the molded articles. The mechanically actuated, mechanically timed stripper plate then ejects each threaded molded article from the corresponding threaded core.

SUMMARY

Conventional molded article removal mechanisms can suffer from a variety of deficiencies. For example, as provided above, with conventional injection molds, threaded cores are typically actuated by a hydraulically operated rack. However, standard clearances and manufacturing tolerances permit small variations in gear tooth size and pitch between the conventional rack and the gearing mechanism associated with the threaded cores. Such variations cause the interacting surfaces of the meshing mechanisms to exhibit small gaps or spaces between their respective meshing teeth. These spaces can allow a limited amount of slack or backlash to enter into the system during operation of the rack and threaded core mechanisms. With the presence of the backlash, the gears of the rack and core mechanisms are prone to wear and can require constant lubrication. Accordingly, conventional unscrewing mechanisms can be expensive to maintain.

Additionally, the configuration of conventional rack and threaded core mechanisms limits the speed at which the molded articles can be unscrewed from the threaded cores. For example, rack and pinion systems on conventional stack molds typically can open and close once every five seconds. Such operation can limit the quantity of threaded molded articles that a conventional injection mold can produce per cycle.

By contrast to conventional injection mold removal mechanisms, embodiments of the present innovation relate to a threaded mold decoupling system. In one arrangement, the threaded mold decoupling system, as utilized with an injection mold, includes a driving assembly having a motor assembly, such as a servo motor or a hydraulic motor, which is coupled to a driver element or gear. The driving assembly also includes a set of idler elements or gears and a driving element or gear rotatably mounted to a mounting plate. The threaded mold decoupling system further includes an elevator assembly having a first elevator element or helical ramp cam follower connected to the driving element and a second elevator element or helical elevator cam follower connected to a fixed plate opposing the mounting plate.

During operation of the threaded mold decoupling system, the motor assembly drives the idler elements which, in turn, rotate the driving element. Rotation of the driving element causes a set of decoupling or unscrewing assemblies to rotate and decouple threaded molded articles from corresponding threaded cores. Further, rotation of the driving elements rotates a helical surface of the first elevator element relative to a helical surface of the fixed second elevator element to linearly translate the unscrewing assemblies relative to the fixed plate as they decouple the threaded molded articles from corresponding threaded core. At the end of the decoupling process, as the mold opens, an ejection mechanism such as a preloaded spring mechanism (e.g., a Bellville disc spring mechanism), can advance a stripper plate forward to eject the threaded molded articles from the corresponding threaded cores. Alternately, an ejection mechanism such as a pneumatic ejection assist system can eject the molded plastic components from the molds.

The first and second elevator elements are configured to provide substantially continuous cam action to the threaded mold decoupling system. For example, during operation, rotation of the driving element in a first direction (e.g., a clockwise direction) causes the first elevator element to rotate in the first direction relative to the second elevator element. This rotation linearly translates the unscrewing assemblies relative to the fixed plate. Further, following ejection of the molded plastic components, rotation of the driving element in a second direction (e.g., a counterclockwise direction) causes the first elevator elements to rotate in a second direction relative to the second elevator element to rewind the first elevator elements to a starting position. The substantially continuous cam action provides a relatively faster cycle time relative to conventional mechanisms, as it is not necessary to reset the elevator elements during the cycle. Further, use of the helical ramp cam follower and helical elevator cam follower provides a relative increase in the speed at which the molded articles can be decoupled from the threaded cores which, in turn, increases the relative quantity of threaded molded articles that an associated injection mold can produce.

In one arrangement, a threaded mold decoupling system includes at least one unscrewing assembly rotatably coupled to a mounting plate and disposed in proximity to a threaded core of an injection mold, an elevator assembly having a first elevator element rotatably coupled to the mounting plate and a second elevator element connected to a fixed plate, the fixed plate opposing the mounting plate, and a driving assembly disposed in operative communication with the at least one unscrewing assembly and with the first elevator element of the elevator assembly. The driving assembly is configured to actuate the at least one unscrewing assembly to rotate a molded article about a longitudinal axis of the threaded core and actuate the first elevator element relative to the second elevator element to linearly translate the mounting plate relative to the fixed plate and to translate the molded article along the longitudinal axis of the threaded core.

In one arrangement, an ejection system, includes a fixed plate, a mounting plate opposing the fixed plate and configured to translate relative to the fixed plate, and a threaded mold decoupling system. The threaded mold decoupling system includes at least one unscrewing assembly rotatably coupled to a mounting plate, the at least one unscrewing assembly disposed in proximity to a threaded core of an injection mold, an elevator assembly having a first elevator element rotatably coupled to the mounting plate and a second elevator element connected to a fixed plate, the fixed plate opposing the mounting plate, and a driving assembly disposed in operative communication with the at least one unscrewing assembly and with the first elevator element of the elevator assembly. The driving assembly is configured to actuate the at least one unscrewing assembly to rotate a molded article about a longitudinal axis of the threaded core and actuate the first elevator element relative to the second elevator element to linearly translate the mounting plate relative to the fixed plate and to translate the molded article along the longitudinal axis of the threaded core.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

A threaded mold decoupling system, as utilized with an injection mold, includes a driving assembly having a motor assembly, such as a servo motor or a hydraulic motor, which is coupled to a driver element or gear. The driving assembly also includes a set of idler elements or gears and a driving element or gear rotatably mounted to a mounting plate. The threaded mold decoupling system further includes an elevator assembly having a first elevator element or helical ramp cam follower connected to the driving element and a second elevator element or helical elevator cam follower connected to a fixed plate opposing the mounting plate.

During operation of the threaded mold decoupling system, the motor assembly drives the idler elements which, in turn, rotate the driving element. Rotation of the driving element causes a set of decoupling or unscrewing assemblies to rotate and decouple threaded molded articles from corresponding threaded cores. Further, rotation of the driving elements rotates a helical surface of the first elevator element relative to a helical surface of the fixed second elevator element to linearly translate the unscrewing assemblies relative to the fixed plate as they decouple the threaded molded articles from corresponding threaded core. The substantially continuous cam action of the first and second elevator elements provides a relatively faster cycle time relative to conventional mechanisms, as it is not necessary to reset the cams during the cycle.

Figure 1:
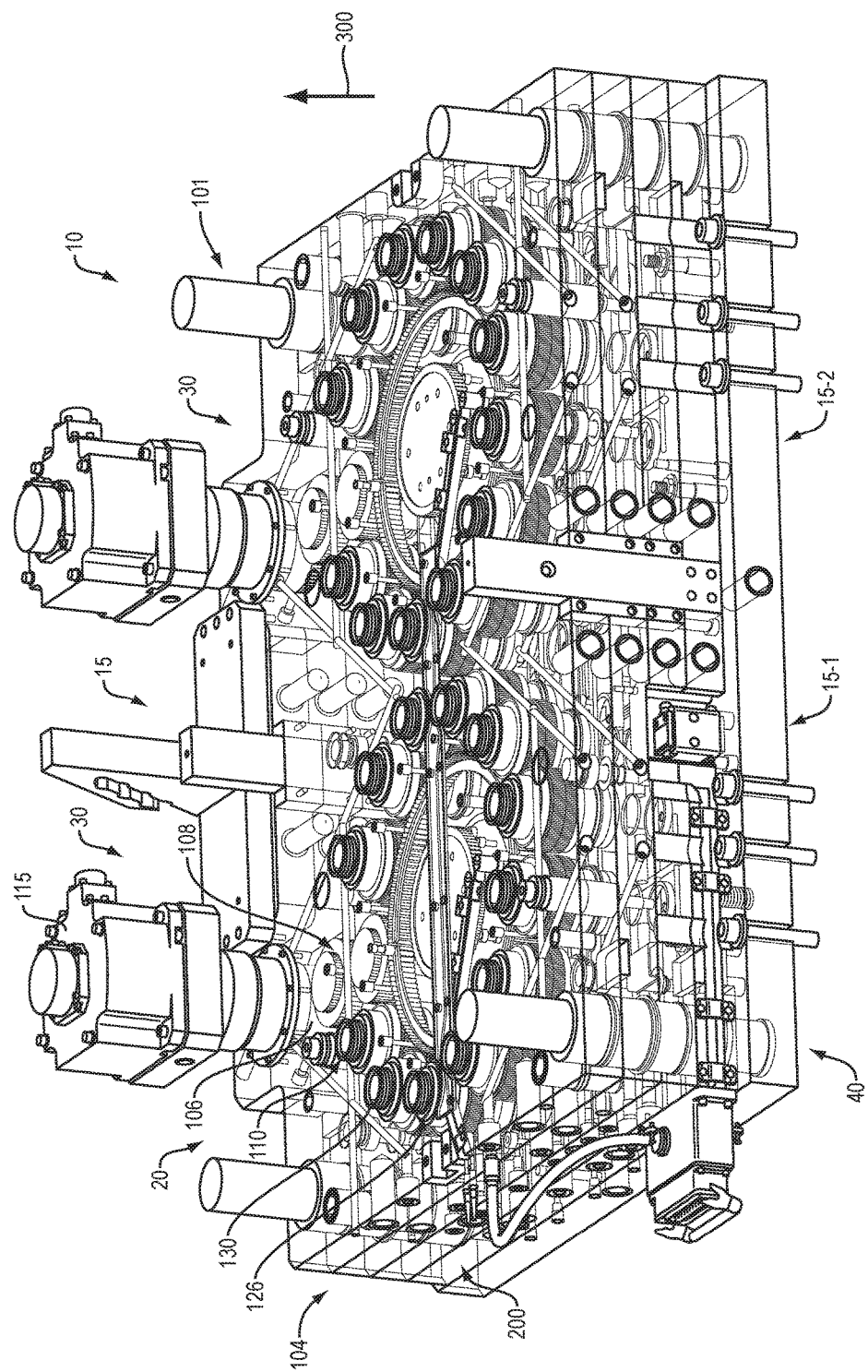
FIG. 1 illustrates a front perspective view of an ejection system disposed in a first position, according to one arrangement.

An example of an ejection system 10 is illustrated in FIG. 1. In one arrangement, the ejection system 10 includes a fixed plate 200 and a mounting plate 104 which opposes the fixed plate 200. As indicated, the fixed plate 200 can be secured in an operating area to limit movement during operation. The mounting plate 104 is configured to translate along direction 300 relative to the fixed plate 200. For example, the ejection system can include longitudinal supports 101 which allow the mounting plate to translate longitudinally along direction 300 relative to the fixed plate 200 while limiting lateral translation.

The system 10 further includes a threaded mold decoupling system 15 disposed in operative communication with the mounting plate 104 and the fixed plate 200. The threaded mold decoupling system 15 includes a set of decoupling or unscrewing assemblies 20, an elevator assembly 40, and a driving assembly 30 disposed in operational communication with the unscrewing assemblies 20 and elevator assembly 40. As indicated in FIG. 1, the ejection system 10 can be configured with any number of threaded mold decoupling systems 15. For example, as shown, the ejection system 10 can include a first threaded mold decoupling system 15-1 and a second threaded mold decoupling system 15-2.

Figure 10:
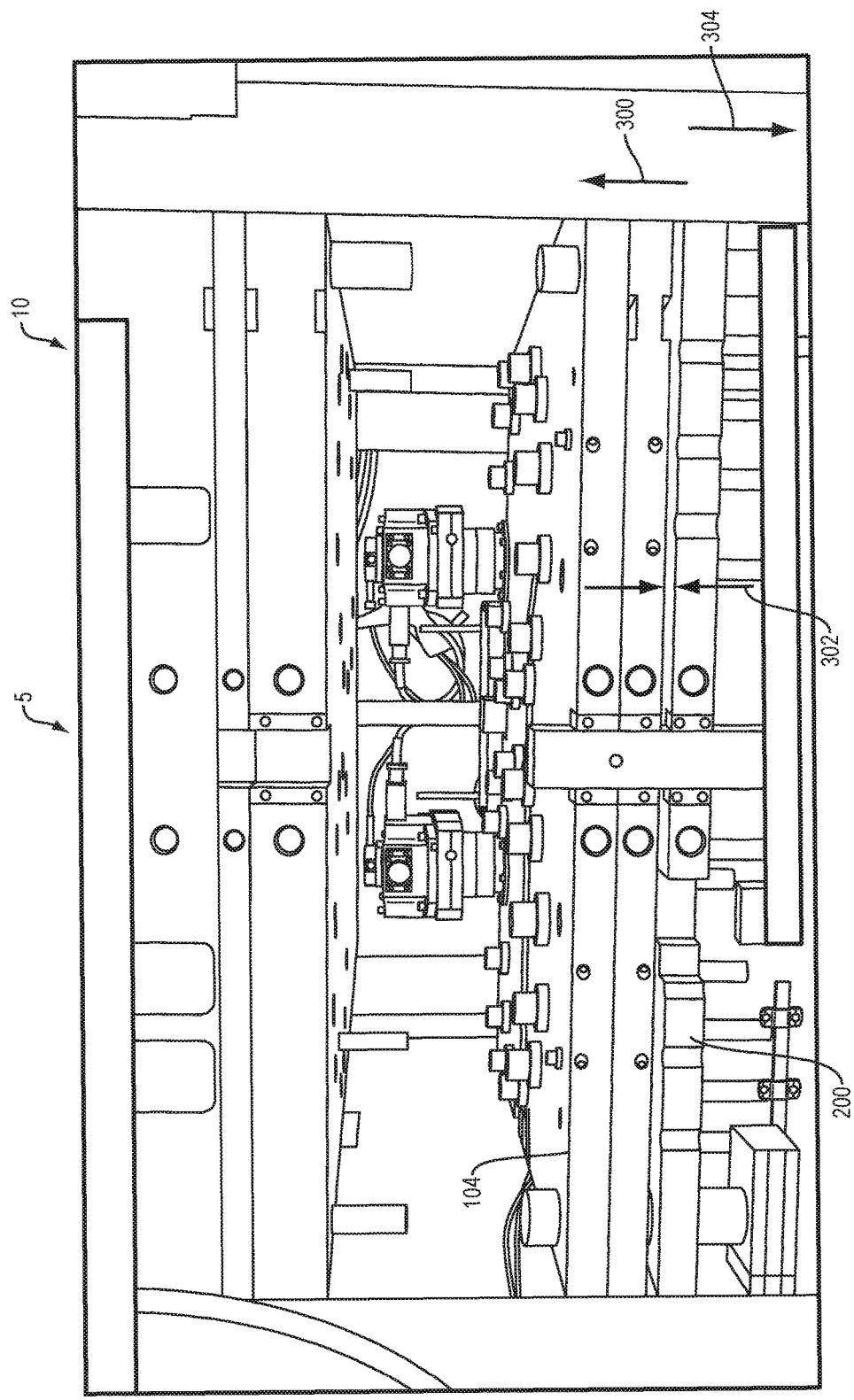
FIG. 10 illustrates a side view of the ejection system of FIG. 1 disposed in a second position, according to one arrangement.

With additional reference to FIG. 10, during operation of an injection mold 5 which utilizes the ejection system 10, as an injector introduces plastic material into the cavities of the injection mold, each threaded core 130 is configured to form threads into a portion of the material. At the end of the molding process, the resulting threaded molded article is threadably mated to the threaded core 130. The driving assembly 30 is configured to rotationally and linearly position the unscrewing assembly 20 relative to the corresponding set of threaded cores 130 to decouple threaded molded articles from the corresponding threaded cores 130 following a molding procedure. For example, interaction between the driving assembly 30 and both the unscrewing assembly 20 and the corresponding elevator assembly 40 can disengage the threaded molded article from the corresponding threaded core 130, as described in detail below.

Figure 2:
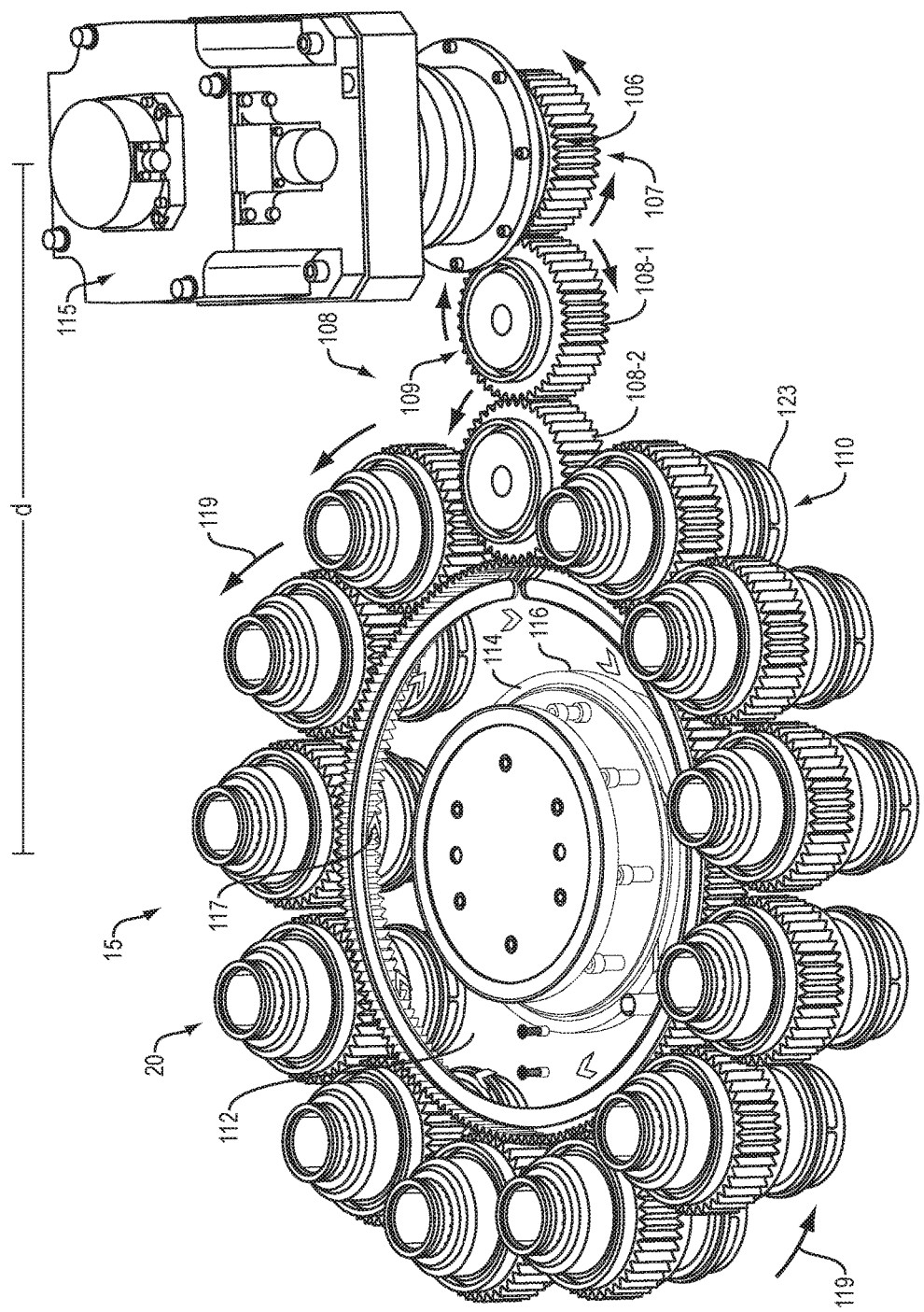
FIG. 2 illustrates a top perspective view of a threaded mold decoupling system of FIG. 1, according to one arrangement

FIG. 2, taken in combination with FIG. 1, illustrates an example arrangement of the driving assembly 30. The driving assembly 30 is disposed in operative communication with the set of unscrewing assemblies 20 and at least a portion of the elevator assembly 40 and is configured to actuate the set of unscrewing assemblies 20 and at least a portion of the elevator assembly 40 during operation, as will be described below.

For example, as shown in FIGS. 1 and 2, the driving assembly 30 includes a driver element 106, a set of idler elements 108, and a driving element 112 which are rotatably coupled, in a single plane, to the mounting plate 104. For example, the mounting plate 104 is configured to support, and to allow relative rotation of, each of the driver element 106, set of idler elements 108, and driving element 112 during operation. While the driver element 106, set of idler elements 108, and the driving element 112 can be configured in a variety of ways, in one arrangement, the elements 108, 108, 112 are configured as gears such that the driver element 106 is configured to mesh with the set of idler elements 108, and the set of idler elements 108 are configured to mesh with the driving element 112.

The driver element 106 is connected to a motor assembly 115, such as a servo motor and gearbox, and includes a set of peripheral teeth 107 which mesh with corresponding peripheral teeth 109 of the set of idler elements 108. The set of idler elements 108 are configured to dispose the motor assembly 115 and the associated driver element 106 at lateral distance d from the driving element 112 in order to minimize interference between the motor assembly 115 and the driving element 112 during operation. While the set of idler elements 108 can include any number of idler elements, in one arrangement, the set of idler elements 108 includes a first idler element 108-1 and a second idler element 108-2.

Rotation of the driving element 112 is configured to actuate the unscrewing assemblies 20 and operate the elevator assembly 40 to disengage threaded molded articles from the corresponding threaded cores 130 following a molding procedure.

Figure 4:
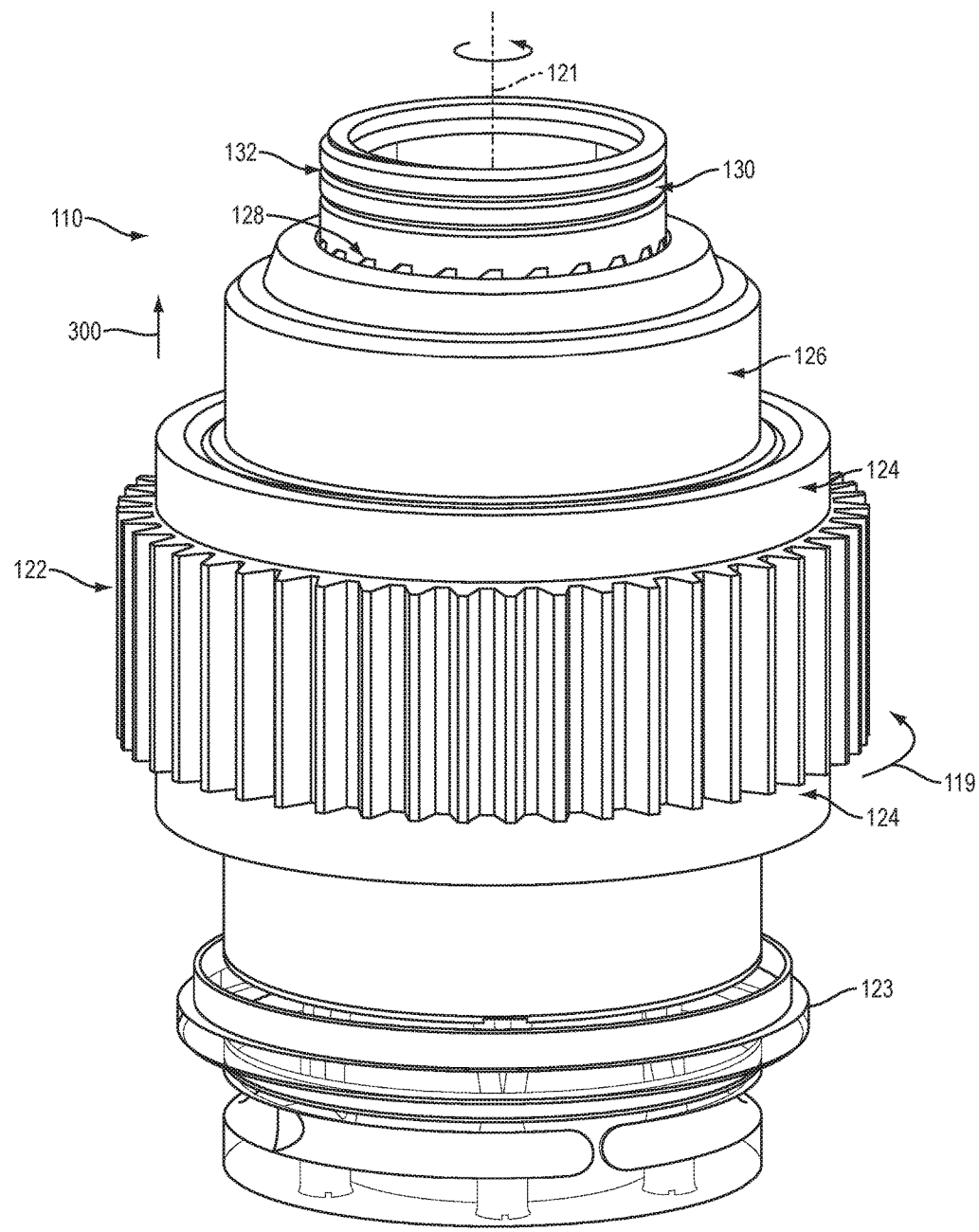
FIG. 4 illustrates a side perspective view of an unscrewing assembly, according to one arrangement.

For example, with reference to both FIGS. 2 and 4, the set of unscrewing assemblies 20 includes a plurality of individual unscrewing assemblies 110 are disposed about an outer circumference of the driving element 112. In the arrangement illustrated, the set of unscrewing assemblies 20 includes twelve unscrewing assemblies 110 disposed about the circumference of the driving element 112 and in operative communication with the driving element 112.

Figure 3:
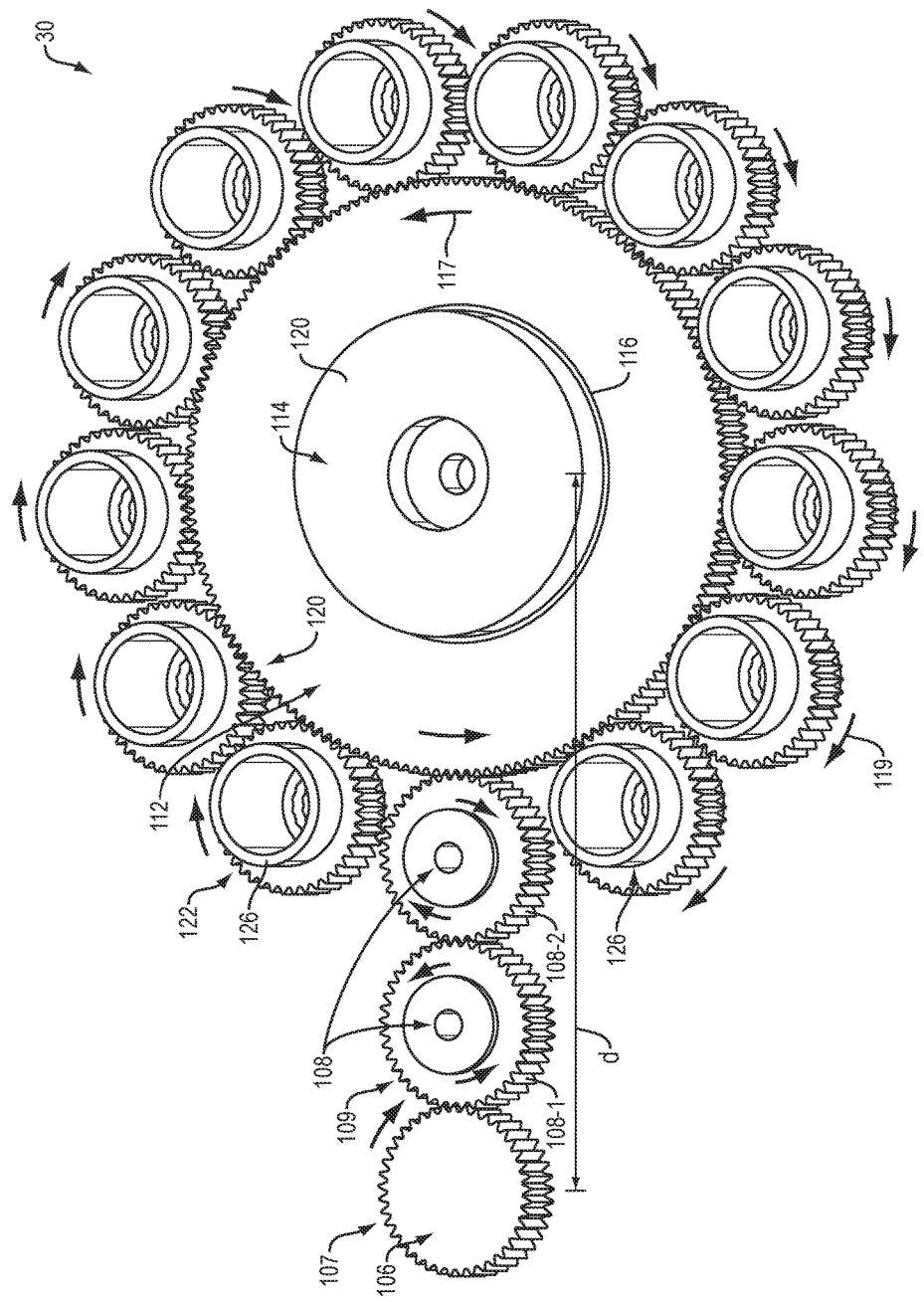
FIG. 3 illustrates a bottom perspective view of a driving assembly of FIG. 2, according to one arrangement.

As indicated in FIG. 4, each unscrewing assembly 110 includes a base 123 and an unscrewing element 126. In one arrangement, the base 123 is connected to the mounting plate 104 and the unscrewing element 126 is rotatably connected to the base 123. The unscrewing element 126 surrounds the threaded core 130 of an injection mold and is disposed in operative communication with the driving element 112. For example, the unscrewing element 126 carries a set of teeth 122 disposed peripherally about a circumference of the unscrewing assembly 110 and bearing elements 124. With reference to FIG. 3, the teeth 122 of the unscrewing element 126 are configured to mesh with a set of teeth 120 disposed peripherally about a circumference of the driving element 112.

Returning to FIG. 4, the unscrewing assembly 110 is configured to engage a portion threaded mold article to allow removal of the threaded mold article from the threaded core 130 following a molding procedure. For example, the unscrewing element 126 includes a set of ratcheting teeth 128 configured to engage a portion of the threaded molded article, such as a base or bottom skirt of a threaded molded article.

In use, rotation of the driving element 112 rotates the unscrewing element 126 of each unscrewing assembly 110 to decouple or loosen a threaded molded article from a corresponding threaded core 130. For example, with particular reference to FIG. 2, rotation of the driver element 106 in a counterclockwise direction causes the driving element 112 to rotate in a clockwise direction 117 via idler elements 108-1, 108-2. Such rotation of the driving element 112 causes the unscrewing element 126 of each unscrewing assembly 110 to rotate in a counterclockwise direction 119. With such rotation of each unscrewing element 126, as indicated in FIG. 4, the ratcheting teeth 128 rotate the threaded molded article counterclockwise about a longitudinal axis 121 relative to threaded core 130. Rotation of the threaded molded article relative to the threaded core 130 disengages the threads of the threaded molded article from corresponding threads 132 of the threaded core 130.

As indicated above, the driving assembly 30 is also configured to operate the elevator assembly 40 to disengage threaded molded articles from the corresponding threaded cores 130. In one arrangement, and with reference to FIGS. 3 and 5-9, the elevator assembly 40 includes a first elevator element 114, also termed a helical ramp cam follower, and a second elevator element 140, also termed a helical elevator cam follower. As will be described below, interaction between the first elevator element 114 and the second elevator element 140 is configured to cause translation of a threaded molded article from the threaded core 130 along a longitudinal direction 300.

Figure 5:
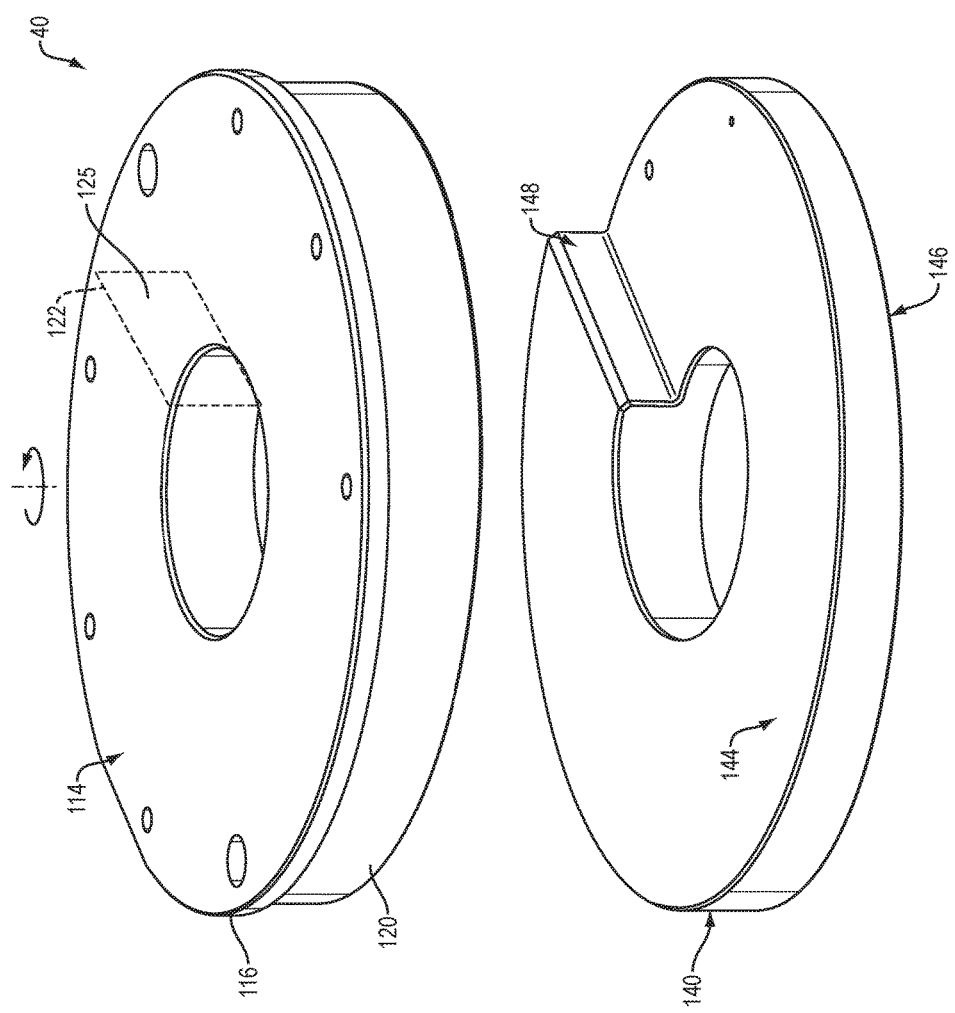
FIG. 5 illustrates an exploded view of an elevator assembly, according to one arrangement.
Figure 6:
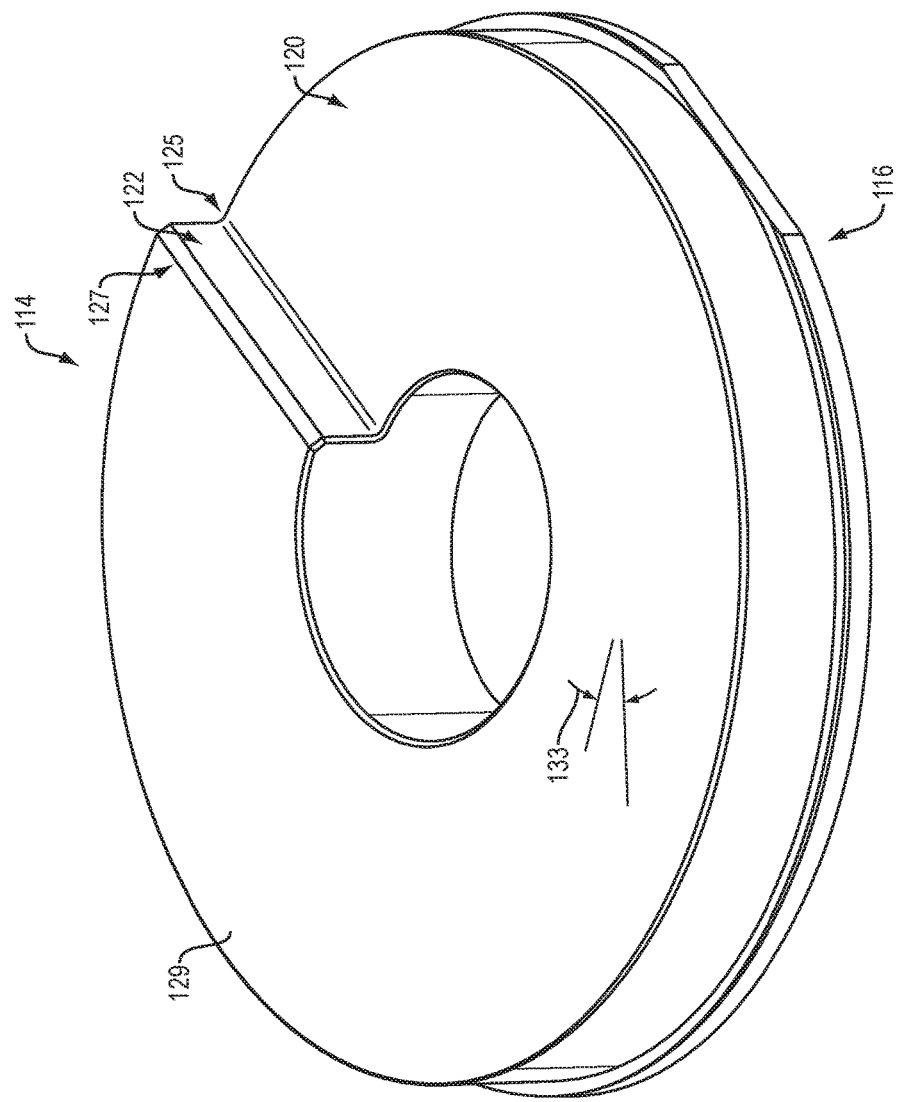
FIG. 6 illustrates a bottom perspective view of a first elevator element of FIG. 5, according to one arrangement.

As shown in FIGS. 5 and 6, the first elevator element 114 includes a first or top portion 116 and a second or bottom portion 120 opposing the first portion 116. With reference to FIGS. 2 and 3, the top portion 116 of the first elevator element 114 is rotatably connected to the mounting plate 104 via driving element 112. For example, the first portion 116 of the first elevator element 114 can be secured to a planar face of the driving element 112 such that the second portion 120 extends toward the fixed plate 200 of the ejection system 10. Alternately, the first portion 116 of the first elevator element 114 can be secured to the driving element 112 such that the second portion 120 of the first elevator element 114 extends through an opening defined by the driving element 112 toward the fixed plate 200. Accordingly, with such connection, rotation of the driving element 112 in a clockwise direction 117 also causes the first elevator element 114 to rotate in a clockwise direction.

With continued reference to FIGS. 5 and 6, the second portion 120 of the first elevator element 114 is configured to engage a first portion 144 of the second elevator element 140. For example, with particular reference to FIG. 6, the second portion 120 of the first elevator element 114 defines a substantially helically-shaped interface 129. As illustrated, the substantially helically-shaped interface 129 of the second portion 120 defines an angle of inclination 133 that increases about the circumference of first elevator element 114 from a first radial location 125 to a second radial location 127. A meeting location or interface between the first and second radial locations 125, 127 defines a vertical face 122 of the first elevator element 114.

Figure 7:
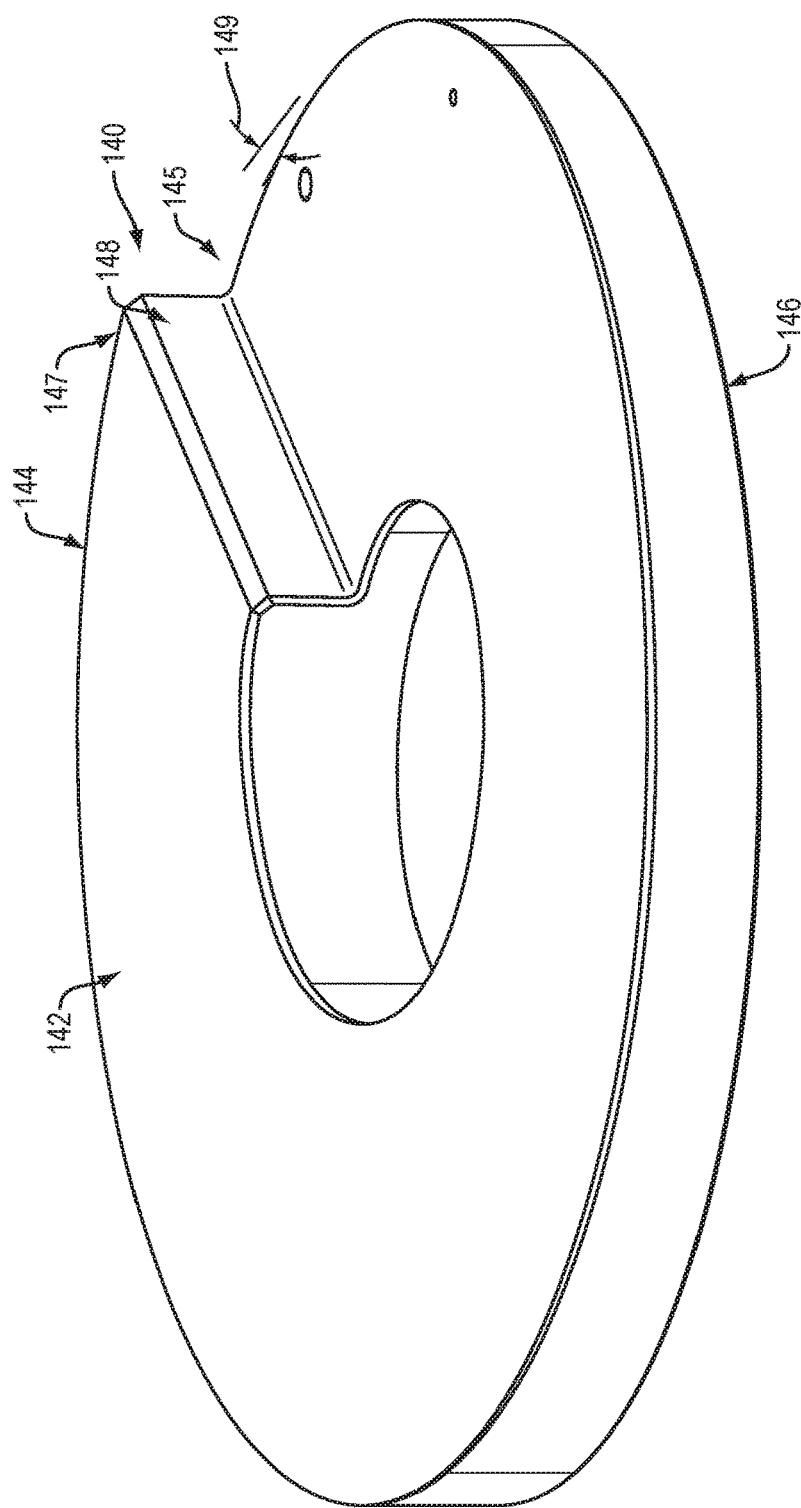
FIG. 7 illustrates a top perspective view of a second elevator element of FIG. 5, according to one arrangement.

As shown in FIGS. 5 and 7, the second elevator element 140 includes the first or top portion 144 and a second or bottom portion 146 opposing the first portion 144. With reference to FIGS. 2 and 3, the second or bottom portion 146 of the second elevator element 140 is connected to the fixed plate 200. Accordingly, in use, rotation of the driving element 112 will not cause substantial motion or rotation of the second elevator element 140.

With particular reference to FIG. 7, the first portion 144 of the second elevator element 140 defines a substantially helically-shaped interface 142. For example, the interface 142 of the first portion 144 defines an angle of inclination 149 that increases about the circumference of the second elevator element 140 from a first radial location 145 to a second radial location 147. A meeting location between the first and second radial locations 145, 147 defines a vertical face 148 of the second elevator element 140.

Figure 8:
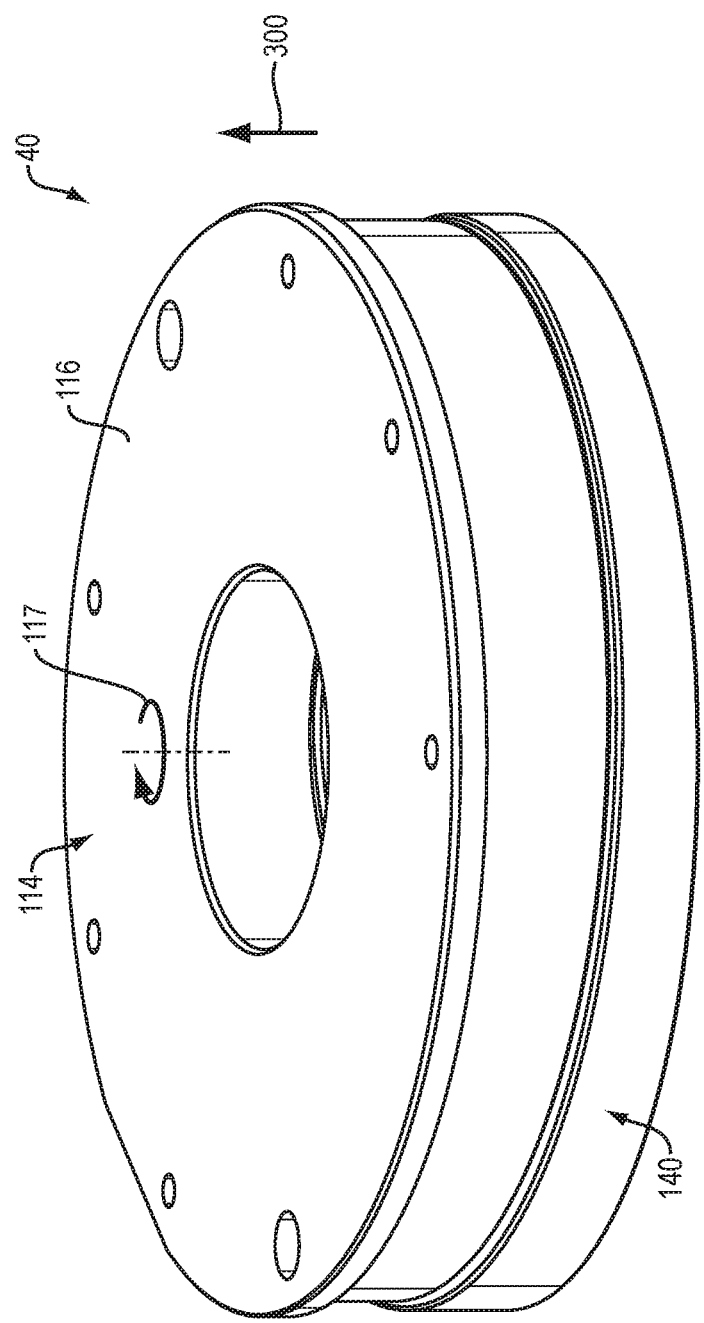
FIG. 8 illustrates a collapsed view of the elevator assembly of FIG. 5, according to one arrangement.
Figure 9:
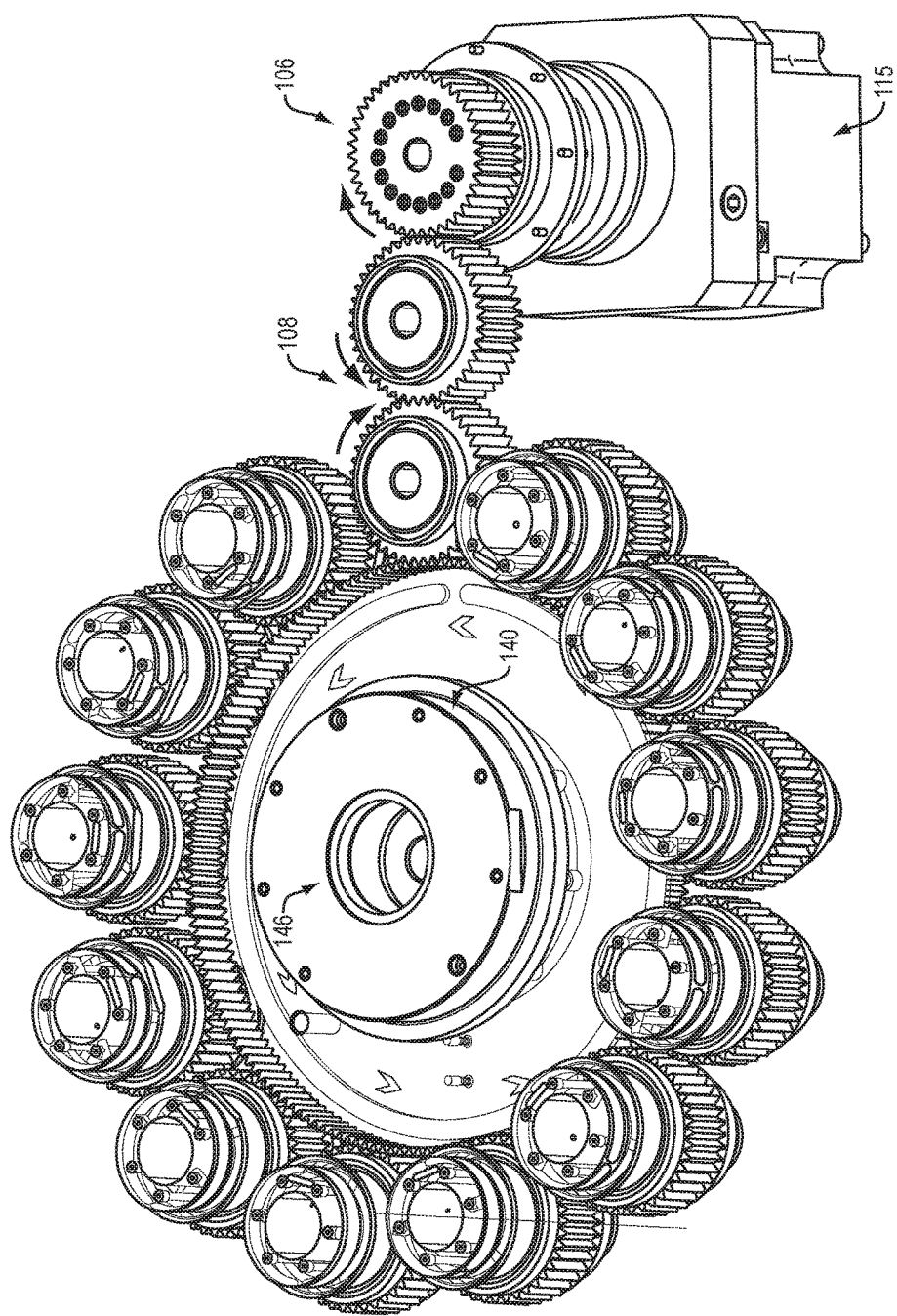
FIG. 9 illustrates a bottom perspective view of the driving assembly of FIG. 2, according to one arrangement.

In use, at the start of operation as indicated in FIGS. 5 and 8, the vertical face 122 of the first elevator element 114 abuts the vertical face 148 of the second elevator element 140. Accordingly, the substantially thickest portion 127 of the helically-shaped interface 129 of the first elevator element 114 opposes the substantially thinnest portion 145 of the helically-shaped interface 142 of the second elevator element 140. With such positioning, the mounting plate 104 and the fixed plate 200 are disposed in a closed or first position as illustrated in FIG. 1.

Rotation of the driving element 112 in a clockwise direction 117 causes the first elevator element 114 to rotate relative to the second elevator element 140 which causes the helically-shaped interface 129 of the first elevator element 114 to rotate relative to the helically-shaped interface 142 of the second elevator element 140. Such rotation move the substantially thickest portion 127 of the interface 129 of the first elevator element 114 towards the substantially thickest portion 147 of the interface 142 of the second elevator element 140. This, in turn, causes the mounting plate 104, including the unscrewing assembly 110, to translate along direction 300 relative to the fixed plate 200 between the first position, as indicated in FIG. 1, and a second or open position, as indicated by the gap 302 between the mounting plate 104 and the fixed plate 200 in FIG. 10. Linear translation of the unscrewing assemblies 110 provides linear translation of molded threaded articles relative to the threaded cores 130 of the injection mold 5.

As described above, the first and second elevator elements 114, 140 are configured to provide substantially continuous cam action to the threaded mold decoupling system 15. The substantially continuous cam action provides a relatively faster cycle time relative to conventional mechanisms, as it is not necessary to reset the elevator elements 114, 140 during the cycle. Further, use of the first and second elevator elements 114, 140 provides a relative increase in the speed at which the molded articles can be decoupled from the threaded cores 130 which, in turn, increases the relative quantity of threaded molded articles that an associated injection mold 5 can produce.

With respect to the operation of the driving assembly 30, the rotation of the driving element 112 causes the unscrewing core 126 of each unscrewing assembly 110 to rotate in a counterclockwise direction to disengage threaded molded articles from their corresponding threaded cores 130. Further, rotation of the driving element 112 also causes linear translation 300 of each unscrewing assembly 110, including the translation of the unscrewing core 126 of each unscrewing assembly 110, relative to the threaded core 130. Accordingly, by providing substantially simultaneous rotational and linear motion to the unscrewing core 126 of each decoupling assembly 110, each unscrewing assembly 110 provides decoupling of a threaded molded article from a corresponding threaded core 130.

In one arrangement, at the end of the decoupling process, as the injection mold opens, an ejection mechanism such as a preloaded spring mechanism (e.g., a Bellville disc spring mechanism), can advance the stripper plate forward to eject the threaded molded articles from the corresponding threaded cores 130. The preloaded spring mechanism, such as a Bellville disc spring mechanism, is configured to provide a preset clearance on a taper shutoff between the decoupling assemblies and the corresponding threaded core 130. Alternately, an ejection mechanism such as a pneumatic ejection assist system can eject the molded plastic components from the injection mold 5.

Following ejection of the molded plastic components, the driving assembly 30 is configured to rewind the first elevator element 114 and unscrewing assemblies 110 back to a starting position.

For example, with reference to FIG. 2, rotation of the driver element 106 by the motor assembly in a clockwise direction (i.e., a second direction relative to the first, counterclockwise direction described above) causes the driving element 112 to rotate in a counterclockwise direction via idler elements 108-1, 108-2. Such rotation of the driving element 112 causes the unscrewing element 126 of each unscrewing assembly 110 to rotate in a clockwise direction to reset the ratcheting teeth 128 to a first or starting position.

Also, rotation of the driving element 112 in the counterclockwise direction causes the first elevator element 114 to rotate in a counterclockwise direction relative to the second elevator element 140. Such rotation translates the substantially thickest portion 127 of the interface 129 of the first elevator element 114 from a location in opposition with the substantially thickest portion 147 of the interface 142 of the second elevator element 140 to a location in opposition with the substantially thinnest portion 145 of the interface 142 of the second elevator element 140. With such positioning, the vertical face 122 of the first elevator element 114 abuts the vertical face 148 of the second elevator element 140. Additionally, such relative positioning of the first and second elevator elements 114, 140 causes the mounting plate 104 to translate along direction 304 relative to the fixed plate 200 between the second position, as indicated in FIG. 10, and a first position, as indicated in FIG. 1.

Figure 11:
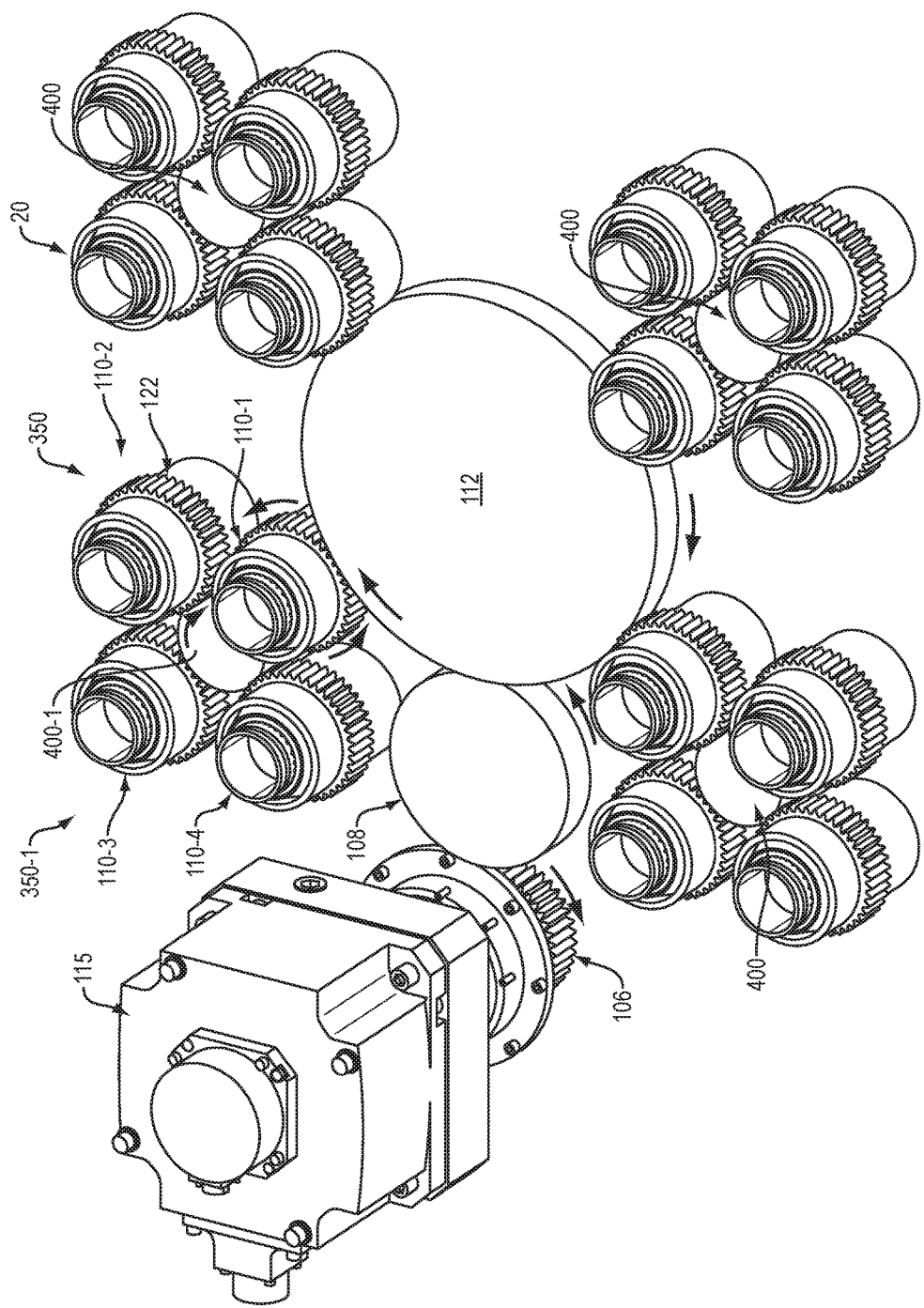
FIG. 11 illustrates an arrangement of a set of unscrewing elements relative to a driving element, according to one arrangement.

In the arrangement indicated above, the set of unscrewing assemblies 20 includes a plurality of individual unscrewing assemblies 110 that are disposed about an outer circumference of the driving element 112. For example, in the arrangement illustrated in FIG. 2, the set of unscrewing assemblies 20 includes twelve unscrewing assemblies 110 disposed about the circumference of the driving element 112 and in operative communication with the driving element 112. In use, the driving element 112 is configured to rotate the unscrewing element 126 of each unscrewing assembly 110 to disengage a threaded molded article from a corresponding treaded core 130. Such an arrangement is by way of example only. In one arrangement, as illustrated in FIG. 11, the set of unscrewing assemblies 20 defines subsets of unscrewing assemblies 350 where each subset of unscrewing assemblies includes a hub element 400 disposed in operative communication with the plurality of unscrewing assemblies and one unscrewing assembly 110 of the subset of unscrewing assemblies 350 being disposed in operative communication with a driving element 112.

Taking the first subset of unscrewing assemblies 350-1 as an example, the first subset of unscrewing assemblies 350-1 includes first, second, third, and fourth unscrewing assemblies 110-1 through 110-4 disposed in operative communication with hub element 400-1. For example, the hub element 400-1 can be a gear having teeth configured to mesh with the teeth 122 of each unscrewing assembly 110-1 through 110-4. The first subset of unscrewing assemblies 350-1 further includes an unscrewing assembly, in this case unscrewing assembly 110-1, disposed in operative communication with the driving element 112, such as via a meshing of the teeth 122 of the unscrewing assembly 110-1 with the teeth 120 of the driving element 112.

In use, and with continued reference to the first subset of unscrewing assemblies 350-1, as the driving element 112 rotates clockwise via rotation of the driver element 106 and idler element 108, the driving element 112 rotates the first unscrewing assembly 110-1 in a counterclockwise direction. Rotation of the first unscrewing assembly 110-1, in turn, rotates the hub element 400-1 in a clockwise direction. The hub element 400-1 transfers this rotational movement to the unscrewing element 126 of each of the second, third, and fourth unscrewing assemblies 110-2, 110-3, 110-4 to decouple or loosen a respective threaded molded article from a corresponding threaded core 130.

While various embodiments of the innovation have been particularly shown and described, it will be understood by those skilled in the art that various changes in form and details may be made therein without departing from the spirit and scope of the innovation as defined by the appended claims.

What is claimed is:

1. A threaded mold decoupling system, comprising:
    at least one unscrewing assembly rotatably coupled to a mounting plate, the at least one unscrewing assembly disposed in proximity to a threaded core of an injection mold;
    an elevator assembly having a first elevator element rotatably coupled to the mounting plate and a second elevator element connected to a fixed plate, the fixed plate opposing the mounting plate; and
    a driving assembly disposed in operative communication with the at least one unscrewing assembly and with the first elevator element of the elevator assembly, the driving assembly configured to:
        actuate the at least one unscrewing assembly to rotate a molded article about a longitudinal axis of the threaded core, and
        actuate the first elevator element relative to the second elevator element to linearly translate the mounting plate relative to the fixed plate and to translate the molded article along the longitudinal axis of the threaded core.

2. The threaded mold decoupling system of claim 1, wherein the driving assembly comprises a driving element rotatably connected to the mounting plate.

3. The threaded mold decoupling system of claim 2, wherein the at least one unscrewing assembly comprises:
    a base connected to the mounting plate; and
    an unscrewing element rotatably connected to the base, the unscrewing element disposed in operative communication with driving element, disposed about the threaded core of the injection mold, and configured to engage a portion of the molded article.

4. The threaded mold decoupling system of claim 3, wherein the at least one unscrewing assembly comprises a plurality of unscrewing assemblies, each unscrewing assembly of the plurality of unscrewing assemblies disposed about an outer circumference of the driving element and each unscrewing assembly of the plurality of unscrewing assemblies disposed in operative communication with the driving element.

5. The threaded mold decoupling system of claim 3, wherein the at least one unscrewing assembly comprises a plurality of unscrewing assemblies and a hub element disposed in operative communication with the plurality of unscrewing assemblies, one unscrewing assembly of the plurality of unscrewing assemblies being disposed in operative communication with the driving element.

6. The threaded mold decoupling system of claim 2, wherein the first elevator element is connected to the driving element and is rotatably connected to the mounting plate via the driving element.

7. The threaded mold decoupling system of claim 6, wherein the first elevator element comprises a substantially helically-shaped interface defining:
    an angle of inclination that increases about the circumference of the first elevator element from a first radial location to a second radial location; and
    a vertical face disposed between the first radial location and the second radial location.

8. The threaded mold decoupling system of claim 7, wherein the second elevator element comprises a substantially helically-shaped interface defining:
    an angle of inclination that increases about the circumference of the second elevator element from a first radial location to a second radial location; and
    a vertical face disposed between the first radial location and the second radial location.

9. The threaded mold decoupling system of claim 1, wherein the driving element is configured to rotate first elevator element relative to second elevator element to dispose the mounting plate between a first position relative to the fixed plate and a second position relative to the fixed plate.

10. An ejection system, comprising:
    a fixed plate;
    a mounting plate opposing the fixed plate and configured to translate relative to the fixed plate; and
    a threaded mold decoupling system, comprising:
        at least one unscrewing assembly rotatably coupled to a mounting plate, the at least one unscrewing assembly disposed in proximity to a threaded core of an injection mold;
        an elevator assembly having a first elevator element rotatably coupled to the mounting plate and a second elevator element connected to a fixed plate, the fixed plate opposing the mounting plate; and
        a driving assembly disposed in operative communication with the at least one unscrewing assembly and with the first elevator element of the elevator assembly, the driving assembly configured to:
            actuate the at least one unscrewing assembly to rotate a molded article about a longitudinal axis of the threaded core, and
            actuate the first elevator element relative to the second elevator element to linearly translate the mounting plate relative to the fixed plate and to translate the molded article along the longitudinal axis of the threaded core.

11. The ejection system of claim 10, wherein the driving assembly comprises a driving element rotatably connected to the mounting plate.

12. The ejection system of claim 11, wherein the at least one unscrewing assembly comprises:
    a base connected to the mounting plate; and
    an unscrewing element rotatably connected to the base, the unscrewing element disposed in operative communication with driving element, disposed about the threaded core of the injection mold, and configured to engage a portion of the molded article.

13. The ejection system of claim 12, wherein the at least one unscrewing assembly comprises a plurality of unscrewing assemblies, each unscrewing assembly of the plurality of unscrewing assemblies disposed about an outer circumference of the driving element and each unscrewing assembly of the plurality of unscrewing assemblies disposed in operative communication with the driving element.

14. The ejection system of claim 12, wherein the at least one unscrewing assembly comprises a plurality of unscrewing assemblies and a hub element disposed in operative communication with the plurality of unscrewing assemblies, one unscrewing assembly of the plurality of unscrewing assemblies being disposed in operative communication with the driving element.

15. The threaded mold decoupling system of claim 11, wherein the first elevator element is connected to the driving element and is rotatably connected to the mounting plate via the driving element.

16. The ejection system of claim 15, wherein the first elevator element comprises a substantially helically-shaped interface defining:

an angle of inclination that increases about the circumference of the first elevator element from a first radial location to a second radial location; and a vertical face disposed between the first radial location and the second radial location.

17. The threaded mold decoupling system of claim 16, wherein the second elevator element comprises a substantially helically-shaped interface defining:

an angle of inclination that increases about the circumference of the second elevator element from a first radial location to a second radial location; and a vertical face disposed between the first radial location and the second radial location.

18. The ejection system of claim 10, wherein the driving element is configured to rotate first elevator element relative to second elevator element to dispose the mounting plate between a first position relative to the fixed plate and a second position relative to the fixed plate.

* * * * *